(12) United States Patent
Alghannam et al.

(10) Patent No.: US 12,047,460 B2
(45) Date of Patent: Jul. 23, 2024

(54) CROSS-COMMUNICATION LINKS FOR A UNIDIRECTIONAL, BILATERAL DATA NETWORK

(71) Applicant: Saudi Arabian Oil Company, Dhahran (SA)

(72) Inventors: Mohammed I. Alghannam, Dammam (SA); Nasser S. Alharthi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/073,115

(22) Filed: Dec. 1, 2022

(65) Prior Publication Data
US 2024/0187491 A1 Jun. 6, 2024

(51) Int. Cl.
| | |
|---|---|
| *H04L 67/145* | (2022.01) |
| *H04L 45/00* | (2022.01) |
| *H04L 67/142* | (2022.01) |

(52) U.S. Cl.
CPC ........... *H04L 67/145* (2013.01); *H04L 45/22* (2013.01); *H04L 67/142* (2013.01)

(58) Field of Classification Search
CPC ...... H04L 67/145; H04L 45/22; H04L 67/142
See application file for complete search history.

(56) References Cited

U.S. PATENT DOCUMENTS

| | | | | |
|---|---|---|---|---|
| 5,675,723 | A * | 10/1997 | Ekrot | G06F 11/2033 714/E11.073 |
| 7,675,867 | B1 * | 3/2010 | Mraz | H04L 63/123 370/254 |
| 10,897,414 | B1 * | 1/2021 | Al-Rushaid | H04L 45/026 |
| 11,095,649 | B2 * | 8/2021 | Al Amer | H04L 63/20 |
| 2004/0218609 | A1 * | 11/2004 | Foster | H04L 69/40 370/401 |
| 2006/0042495 | A1 * | 3/2006 | Russell | F42D 1/05 102/217 |
| 2006/0077888 | A1 * | 4/2006 | Karam | H04L 12/10 370/216 |
| 2008/0219292 | A1 * | 9/2008 | Wang | H04L 49/10 370/484 |

(Continued)

*Primary Examiner* — Jimmy H Tran
(74) *Attorney, Agent, or Firm* — Fish & Richardson P.C.

(57) ABSTRACT

A system and method can include receiving a data packet at a low-side network element of a unidirectional, bilateral network system; transmitting the data packet to a primary high-side network element through a primary one-way data diode; and transmitting a duplicate of the data packet to a secondary high-side network element through a unidirectional cross-communications link. The system and method can also involve receiving, at the secondary high-side network element, a health status from the primary high-side network element; determining, by the secondary high-side network element, that the primary high-side network element is experiencing a fault condition based on the health status; and transmitting the data packet towards a data destination based on the determination that the primary high-side network element is experiencing the fault condition. The unidirectional cross-communications link supporting one-way communication from the primary low-side network element to the secondary high-side network element in a unidirectional, bilateral network.

16 Claims, 7 Drawing Sheets

(56) References Cited

U.S. PATENT DOCUMENTS

| | | | | |
|---|---|---|---|---|
| 2008/0222532 | A1* | 9/2008 | Mester | H04L 63/145 |
| | | | | 726/25 |
| 2011/0200048 | A1* | 8/2011 | Thi | H04B 3/234 |
| | | | | 704/226 |
| 2012/0017079 | A1* | 1/2012 | Mraz | H04L 9/3236 |
| | | | | 713/153 |
| 2012/0188868 | A1* | 7/2012 | Saavedra | H04L 41/5077 |
| | | | | 370/221 |
| 2013/0262887 | A1* | 10/2013 | Biederman | H04L 12/10 |
| | | | | 713/310 |
| 2014/0294180 | A1* | 10/2014 | Link, II | G08G 1/205 |
| | | | | 380/270 |
| 2015/0163198 | A1* | 6/2015 | Moore | H04L 63/029 |
| | | | | 726/14 |
| 2015/0188985 | A1* | 7/2015 | Marty | H04L 63/0227 |
| | | | | 709/218 |
| 2017/0048259 | A1* | 2/2017 | Dodge | H04L 63/168 |
| 2017/0339217 | A1* | 11/2017 | Morrill | H04W 48/00 |
| 2018/0115457 | A1* | 4/2018 | Bonomi | H04L 45/22 |
| 2018/0326314 | A1* | 11/2018 | Ireland | A63H 19/24 |
| 2018/0375876 | A1* | 12/2018 | Blöcher | H04L 63/20 |
| 2019/0018467 | A1* | 1/2019 | Patterson | G06F 13/362 |
| 2019/0081878 | A1* | 3/2019 | Lawrence | H04L 63/0209 |
| 2019/0356600 | A1* | 11/2019 | Barton | H04L 43/0852 |
| 2020/0120071 | A1* | 4/2020 | Wimmer | H04L 69/165 |
| 2020/0186460 | A1* | 6/2020 | Power | H04L 49/254 |
| 2020/0244487 | A1* | 7/2020 | Morimoto | H04L 61/103 |
| 2020/0320023 | A1* | 10/2020 | Litichever | G06F 21/56 |
| 2020/0358840 | A1* | 11/2020 | Hurst | H04L 67/52 |
| 2020/0412722 | A1* | 12/2020 | Al Amer | H04L 63/10 |
| 2021/0021499 | A1* | 1/2021 | Al-Rushaid | H04L 45/026 |
| 2021/0176223 | A1* | 6/2021 | Falk | H04L 63/0281 |
| 2021/0240142 | A1* | 8/2021 | Bang | G05B 11/42 |
| 2021/0367972 | A1* | 11/2021 | Lee | H04L 9/0643 |
| 2022/0329522 | A1* | 10/2022 | Maciocco | H04L 41/16 |
| 2022/0337651 | A1* | 10/2022 | Al-Dahleh | G10L 19/167 |
| 2023/0016946 | A1* | 1/2023 | Wouhaybi | G06F 16/901 |

\* cited by examiner

CROSS-COMMUNICATION LINKS FOR A UNIDIRECTIONAL, BILATERAL DATA NETWORK

FIELD

This disclosure pertains to cross-communication links for a bilateral, unidirectional data network.

BACKGROUND

Network security and cyber security includes the protection of underlying data, as well as the protection of network elements themselves, from external attacks. Such external attacks can come in the form of malware threats, data leakage, and operational disruptions.

SUMMARY

The present disclosure describes techniques that can be used for improving reliability of a unidirectional, bilateral network by a cross-communication structure and protocol.

In some implementations, a computer-implemented method includes the following.

Aspects of the embodiments are directed to a unidirectional, bilateral network system that includes a primary data channel including a primary one-way data diode connecting a data source to a data destination, wherein the primary one-way data diode includes a primary low-side network element and a primary high-side network element, the primary one-way data diode configured to permit data flow from the primary low-side network element to the primary high-side network element and not from the primary high-side network element to the primary low-side network element. The unidirectional, bilateral network system can also include a secondary data channel for redundancy that includes a secondary one-way data diode connecting the data source to the data destination, wherein the secondary one-way data diode includes a secondary low-side network element and a secondary high-side network element, the secondary one-way data diode configured to permit data flow from the secondary low-side network element to the secondary high-side network element and not from the secondary high-side network element to the secondary low-side network element. The unidirectional, bilateral network system a heartbeat link coupling the primary high-side network element and the secondary high-side network element, the heartbeat link to transmit a periodic signal from the primary high-side network element to the secondary high-side network element at regular intervals to indicate a status of the primary high-side network element. Unidirectional, bilateral network system can also include a unidirectional cross-communications link coupling the primary low-side network element to the secondary high-side network element, the unidirectional cross-communications link configured to transmit data from the primary low-side network element to the secondary high-side network element and not from the secondary high-side network element to the primary low-side network element. The primary low-side network element is configured to transmit a copy of data to the secondary high-side network element across the unidirectional cross-communications link. The secondary high-side network element is configured to transmit or ignore data received on the unidirectional cross-communication link based on the status of the primary high side network element.

Aspects of the embodiments are directed to a method that includes receiving a data packet at a low-side network element of a unidirectional, bilateral network system; transmitting the data packet to a primary high-side network element through a primary one-way data diode; and transmitting a duplicate of the data packet to a secondary high-side network element through a unidirectional cross-communications link.

Aspects of the embodiments are directed to a non-transitory, computer-readable storage medium storing instructions that, when executed by a hardware processor, perform operations that include receiving a data packet at a low-side network element of a unidirectional, bilateral network system; transmitting the data packet to a primary high-side network element through a primary one-way data diode; and transmitting a duplicate of the data packet to a secondary high-side network element through a unidirectional cross-communications link.

In some embodiments, the secondary high-side network element is configured to transmit the data received on the unidirectional cross-communications link towards the data destination when the status of the primary high-side network element indicates that the primary high-side network element is experiencing a fault condition; and ignore the data received on the unidirectional cross-communications link when the status of the primary high-side network element indicates that the primary high-side network element is functioning.

In some embodiments, the primary low-side network element is configured to receive a data packet originating from the data source; transmit the data packet through the primary one-way diode to the primary high-side network element; and transmit a duplicate of the data packet through the unidirectional cross-communications link to the secondary high-side network element.

In some embodiments, the unidirectional cross-communications link is a primary unidirectional cross-communications link, and the unidirectional, bilateral network system further includes a secondary unidirectional cross-communications link coupling the secondary low-side network element to the primary high-side network element, the secondary unidirectional cross-communications link configured to transmit data from the secondary low-side network element to the primary high-side network element and not from the primary high-side network element to the secondary low-side network element.

In some embodiments, the primary high-side network element is configured to transmit a data packet originating from the data source towards the data destination, wherein the data packet is received from either the primary one-way data diode or the secondary unidirectional cross-communications link.

In some embodiments, the heartbeat link is a high-side heartbeat link, the system further includes a low-side heartbeat link coupling the primary low-side network element and the secondary low-side network element, the heartbeat link to transmit a periodic signal from the primary low-side network element to the secondary low-side at regular intervals to indicate a status of the primary low-side network element.

In some embodiments, the secondary low-side network element is configured to receive a data packet originating from the data source; determine a health status of the primary low-side network element indicates that the primary low-side network element is experiencing a fault condition; transmit the data packet through the secondary one-way diode to the secondary high-side network element; and transmit a duplicate of the data packet through the unidirectional cross-communications link to the primary high-side network element.

In some embodiments, the secondary high-side network element is to receive the data packet; determine the health status of the primary high-side network element; and transmit the data packet towards the data destination based on the health status of the primary high-side network element indicating a fault condition.

Some embodiments can include receiving, at the secondary high-side network element, a health status from the primary high-side network element; determining, by the secondary high-side network element, that the primary high-side network element is experiencing a fault condition based on the health status; and transmitting the data packet towards a data destination based on the determination that the primary high-side network element is experiencing the fault condition.

Some embodiments can include receiving, at the secondary high-side network element, a health status from the primary high-side network element; determining, by the secondary high-side network element, that the primary high-side network element is operational; and deleting the data packet based on the determination that the primary high-side network element is operational.

Some embodiments can include transmitting, by the primary high-side network element, the data packet towards a data destination.

In some embodiments, the low-side network element includes a primary low-side network element, and the method includes receiving, at a secondary low-side network element, a health status of the primary low-side network element.

Some embodiments can include receiving the data packet at the secondary low-side network element; determining, by the secondary low-side network element, that the primary low-side network element is experiencing a fault condition based on the health status; and transmitting the data packet to the secondary high-side network element through a secondary one-way data diode; and transmitting a duplicate of the data packet to the primary high-side network element through a secondary unidirectional cross-communications link.

In some embodiments, operations can include receiving, at the secondary high-side network element, a health status from the primary high-side network element; determining, by the secondary high-side network element, that the primary high-side network element is experiencing a fault condition based on the health status; and transmitting the data packet towards a data destination based on the determination that the primary high-side network element is experiencing the fault condition.

In some embodiments, operations can include receiving, at the secondary high-side network element, a health status from the primary high-side network element; determining, by the secondary high-side network element, that the primary high-side network element is operational; and deleting the data packet based on the determination that the primary high-side network element is operational.

In some embodiments, operations can include transmitting, by the primary high-side network element, the data packet towards a data destination.

In some embodiments, the low-side network element includes a primary low-side network element, and the operations include receiving, at a secondary low-side network element, a health status of the primary low-side network element.

In some embodiments, operations can include receiving the data packet at the secondary low-side network element; determining, by the secondary low-side network element, that the primary low-side network element is experiencing a fault condition based on the health status; transmitting the data packet to the secondary high-side network element through a secondary one-way data diode; and transmitting a duplicate of the data packet to the primary high-side network element through a secondary unidirectional cross-communications link.

The described implementations are implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. For example, the cross-communication links coupling individual unidirectional networks can improve reliability by ensuring data is routed through an operational network and without unnecessarily duplicating data for transmission and without compromising security features.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements.

DETAILED DESCRIPTION

This disclosure describes a unidirectional, bilateral network system that includes one or more unidirectional cross-links to facilitate secure and reliable data propagation. The following detailed description describes techniques for securely and reliably transmitting data in a unidirectional, bilateral network system that includes primary and secondary data diodes. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1A:
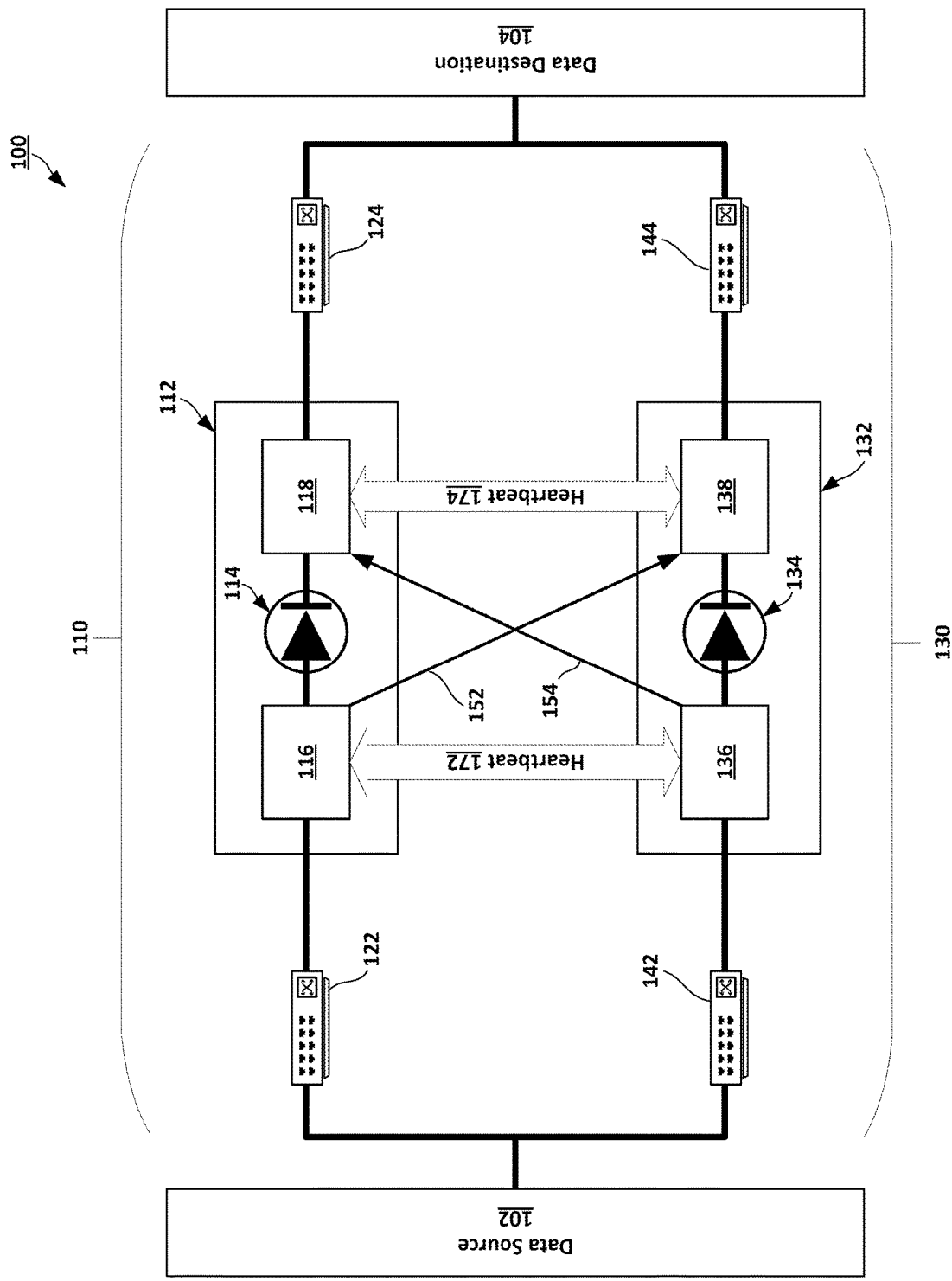
FIGS. 1A-B are schematic diagrams illustrating an example unidirectional, bilateral network system in accordance with embodiments of the present disclosure.
Figure 1B:
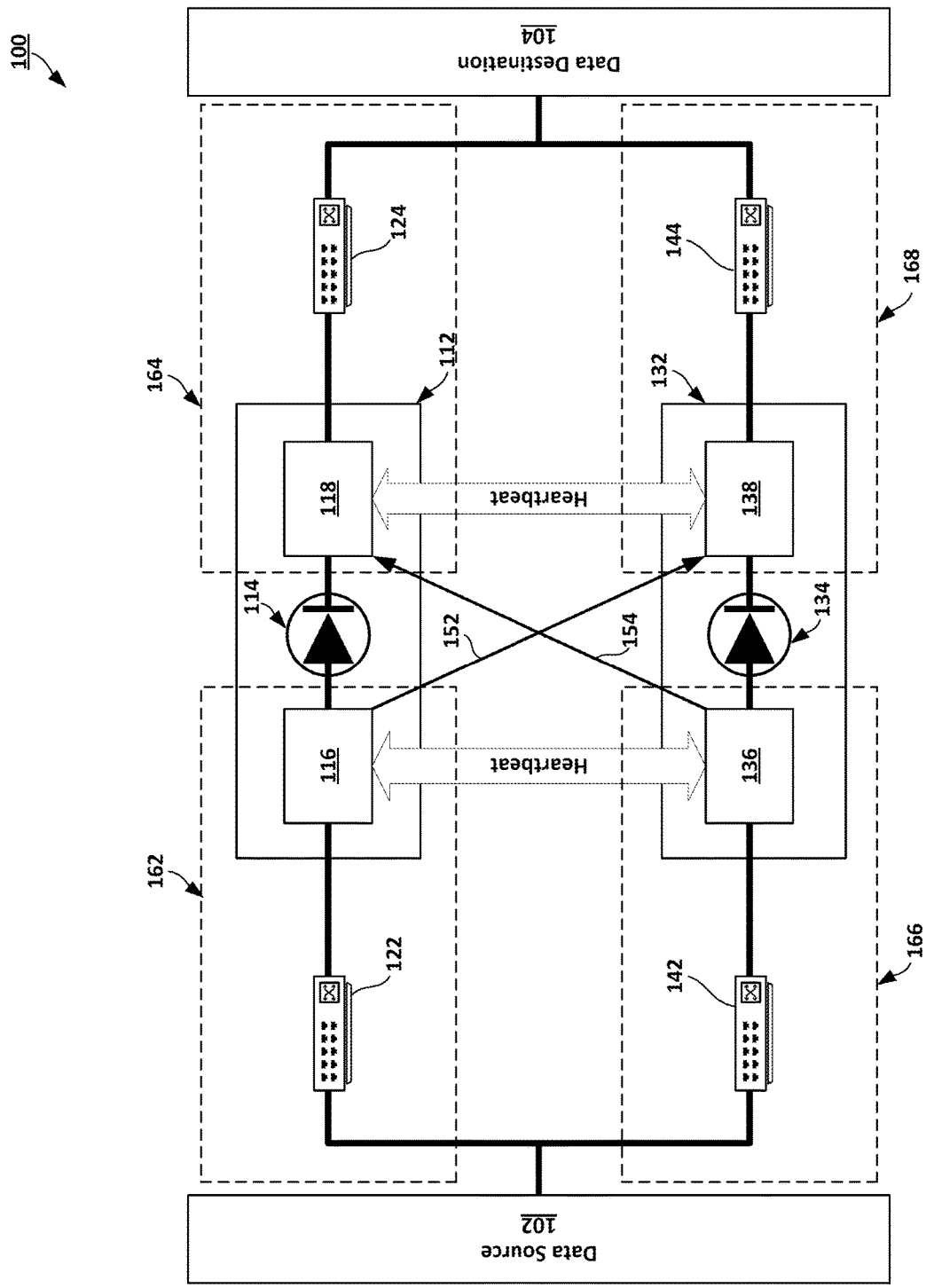

FIGS. 1A-B are schematic diagrams illustrating an example unidirectional, bilateral network system in accordance with embodiments of the present disclosure. FIGS. 1A and 1B show the unidirectional, bilateral network system using four "quadrants"; accordingly, FIGS. 1A and 1B can be viewed together to ease the description. The unidirectional, bilateral network system 100 can securely couple a data source 102 to a data destination 104 and facilitate one-way communication of data packets from the data source 102 to the data destination 104. The data source 102 can be a network, a computing device, a networked storage device, a server, a switch complex, or other network element that is coupled upstream of the data channels 110 and 130 (described later). Data source 102 is where a data packet originates for the purposes of describing this specific unidirectional, bilateral network system 100. The data packet can originate somewhere else, and arrive at the data source 102, but for the purposes of describing this unidirectional, bilateral network system 100, data source 102 is considered to be where the data packet originates for its journey towards the data destination 104. Data destination 104 can be another network, computer, networked storage device, server, or other network element that is either the final destination for the data packet or an intermediate destination for the data packet. That is, the data packet can include within its address field, the address of the data destination 104. The unidirectional, bilateral network system 100 can be implemented using hardware, software, or a combination of hardware and software. The unidirectional, bilateral network system 100 can also be a virtual network.

In some embodiments, the data source 102 can have a different (e.g., lower) security rating as the data destination 104. In that case, data should only flow in one direction: from the data source 102 to the data destination 104, and not from the data destination 104 to the data source 102. The unidirectional, bilateral network system 100 facilitates the one-way propagation of data packets to preserve network security protocols.

In FIG. 1A, the unidirectional, bilateral network system 100 is shown with two data channels. The term "bilateral" is used to describe the unidirectional, bilateral network system as having two data channels that act as redundancies, each of the two data channels being unidirectional and for transmitting data from a data source to a data destination. The unidirectional, bilateral network system 100 includes a primary data channel 110 and a secondary data channel 130, shown in FIG. 1A.

As shown in FIG. 1B, the primary data channel 110 includes a primary low-side 162 and a primary high-side 164; likewise, the secondary data channel 130 includes a secondary low-side 166 and a secondary high-side 168. The term "low-side" is used to define a portion of the unidirectional, bilateral network system 100 that is upstream of the data diodes 114 and 134. The term "high-side" is used to define a portion of the unidirectional, bilateral network system 100 that is downstream of the data diodes 114 and 134. Thus, when viewing FIGS. 1A and 1B together, the unidirectional, bilateral network system 100 is shown to include a primary data channel 110 with a primary low-side 162 and a primary high-side 164; and also includes a secondary data channel 130 with a secondary low-side 166 and a secondary high-side 168.

To support redundancy in the unidirectional, bilateral network system 100, the primary data channel 110 is used unless a fault condition arises in one of the components of the primary data channel 110. Data traffic from the data source 102 is delivered in the primary data channel 110 from the primary low-side 162 through the primary data diode 114 and through the primary high-side 164, and to the data destination 104. In the event conditions indicating a failover of the primary data channel 110 become evident, the secondary data channel 130 functions as a "backup" channel and commences transmission of the identical signals it is receiving from the data source 102 to the data destination 104. It is to be understood that the respective roles of the primary data channel 110 and the secondary data channel 130 as "primary" and "backup," respectively, can be switched, merely by trading the roles (and the associated failover logic) of the respective components therein.

In FIG. 1A, unidirectional, bilateral network system 100 is shown securely coupling a data source 102 and a data destination 104. In accordance with embodiments of the disclosure, primary data channel 110 and a secondary data channel 130 both extend from at least one output channel of the data source 102. A data packet originating from the data source 102 can traverse the primary data channel 110 through a primary low-side network switch and into the primary data diode structure 112. From the primary data diode structure 112, the data packet can enter a primary high-side network switch 124 for routing to the data destination 104. The primary high-side network switch 124 can couple to multiple data destinations, though only one is shown. Likewise, primary low-side network switch 122 can couple to many data sources. Thus, the network switches are used for directing the data to the correct destination.

The unidirectional, bilateral network system 100 also includes a secondary data channel 130 for redundancy. In the event that one or more elements of the primary data channel 110 experience a fault, one or more elements of the secondary data channel 130 can be used to route the data. Thus, the secondary data channel 130 includes the same elements as the primary data channel 110. For example, a data packet originating from the data source 102 can traverse the secondary data channel 130 through a secondary low-side network switch 142 and into the secondary data diode structure 132. From the secondary data diode structure 132, the data packet can enter a secondary high-side network switch 144 for routing to the data destination 104. The secondary high-side network switch 144 can couple to multiple data destinations, though only one is shown. Likewise, secondary low-side network switch 142 can couple to many data sources.

The primary data diode structure 112 includes a primary data diode 114; likewise, secondary data diode structure 132 includes a secondary data diode 134. Primary data diode 114 and secondary data diode 134 can be considered identical or substantially identical in structure, function, or both structure and function. Generally, a data diode is a unidirectional network communication device or appliance that facilitates the safe, one-way transfer of data between segmented networks. Data diodes can include hardware network elements and software or firmware control of data flow to permit data flow only in one direction. The data diode can include serial ports, data conversion elements, receiver elements, and transmitter elements, that together facilitate the flow of data in one direction. A data diode can be coupled between an output serial port of the data source 102 (which can be a low security level processor board/computer) and an input serial port of the data destination 104 (which can be of a higher security level processor board/computer). The connection can be made using universal serial bus connectors or other serial, peripheral, and/or network connections. Data can therefore be safely transferred from the data source 102 to the data destination 104 without any return signal path being available, thereby preventing a low security network or computer system from obtaining data from a higher security level network or computer system.

The primary data diode structure 112 also includes a primary low-side network element 116. The primary low-side network element 116 can include hardware, software, or a combination of hardware and software to manage the upstream portions of the primary data channel 110. For example, the primary low-side network element 116 can maintain status information for the primary low-side 162 and for the secondary low-side 166. The primary low-side network element 116 can also communicate with the secondary low-side network element 136 to exchange status information. For example, the primary low-side network element 116 can exchange low-side system heartbeat information using a heartbeat channel 172 that couples the primary low-side network element with a secondary low-side network element 136 of the secondary data diode structure 132. The primary low-side network element 116 can also maintain health status information for other primary low-side components. The primary low-side network element 116 can also parse data packet header information to transmit data packets to next-hop destinations.

The primary data diode structure 112 also includes a primary high-side network element 118. The primary high-side network element 118 can include hardware, software, or a combination of hardware and software to manage the downstream portions of the primary data channel 110. (Here, downstream means downstream of the primary data diode 114.) For example, the primary high-side network element 118 can maintain status information for the primary high-side 164 and for the secondary high-side 168. The primary high-side network element 118 can also communicate with the secondary high-side network element 138 to exchange status information. For example, the primary high-side network element 118 can exchange high-side system heartbeat information using a heartbeat channel 174 coupling the primary high-side network element 118 with a secondary high-side network element 138 of the secondary data diode structure 132. The primary high-side network element 118 can also maintain health status information for other primary high-side components. The primary high-side network element 118 can also parse data packet header information to transmit data packets to next-hop destinations.

The secondary data diode structure 132 also includes a secondary low-side network element 136. The secondary low-side network element 136 can include hardware, software, or a combination of hardware and software to manage the upstream portions of the secondary data channel 130. For example, the secondary low-side network element 136 can maintain status information for the secondary low-side 166 and for the primary low-side 162. The secondary low-side network element 136 can also communicate with the primary low-side network element 116 to exchange status information. For example, the secondary low-side network element 136 can exchange low-side system heartbeat information using a heartbeat channel 172 that couples the primary low-side network element 116 with a secondary low-side network element 136 of the secondary data diode structure 132. The secondary low-side network element 136 can also maintain health status information for other secondary low-side components. The secondary low-side network element 136 can also parse data packet header information to transmit data packets to next-hop destinations.

The secondary data diode structure 132 also includes a secondary high-side network element 138. The secondary high-side network element 138 can include hardware, software, or a combination of hardware and software to manage the downstream portions of the secondary data channel 130. For example, the secondary high-side network element 138 can maintain status information for the secondary high-side 168 and for the primary high-side 164. The secondary high-side network element 138 can also communicate with the primary high-side network element 118 to exchange status information. For example, the secondary high-side network element 138 can exchange high-side system heartbeat information using a heartbeat channel 174 coupling the primary high-side network element 118 with a secondary high-side network element 138 of the secondary data diode structure 132. The secondary high-side network element 138 can also maintain health status information for other secondary high-side components. The secondary high-side network element 138 can also parse data packet header information to transmit data packets to next-hop destinations.

The exchange of heartbeat information can be used to maintain continuous, real-time indication that both data channels of the system are still functioning. The heartbeat can be any conventional signal that is indicative of device operation and which switches between high and low at a regular interval. By way of illustration, the signal can switch from high to low, from low to high, or include a square pulse such as a pulse having a specified duty cycle. In one implementation, for example, the heartbeat can be tapped from or based upon a system or microprocessor clock of the data diode structures 112, 132, respectively. The period of the heartbeat can be down cycled to a desired rate, such as once per second.

The heartbeat signal can indicate a status for the various primary low- and high-side components and the various secondary low- and high-side components. In the event that the heartbeat signals a status indicating a fault condition at a component, certain action can be taken to ensure that data traffic continues to be transmitted seamlessly through the unidirectional, bilateral network system 100.

An example data flow for the example unidirectional, bilateral network system can include data packets being sent from the data source 102 to the floating IP (also known as virtual IP) on primary low-side 162 of the primary data channel 110. The data packets are passed through the primary data channel 110 based on the heartbeat status indications. If one of the primary components is down or experiencing a fault condition, the data packets can traverse the secondary data channel 130. The low-side components that are active will send data to the high-side components. Thus, the data flow will complete the journey to its destination through high-side components.

Noteworthy is that the heartbeat status indications provide status information for low-side components and high-side components. To ensure that data is transmitted completely through the network, this disclosure describes a unidirectional, cross-communications links (or crosslink, for short) that permits the transmission of data from the primary low-side 162 to the secondary high-side 168 to ensure data transmission in the event that a high-side component is experiencing a fault condition while its counterpart low-side component is functioning normally. Likewise, a unidirectional crosslink can couple the secondary low-side 166 with the primary high-side 164, in case the secondary high-side components are faulty or down, but the primary high-side components are functioning.

Figure 2A:
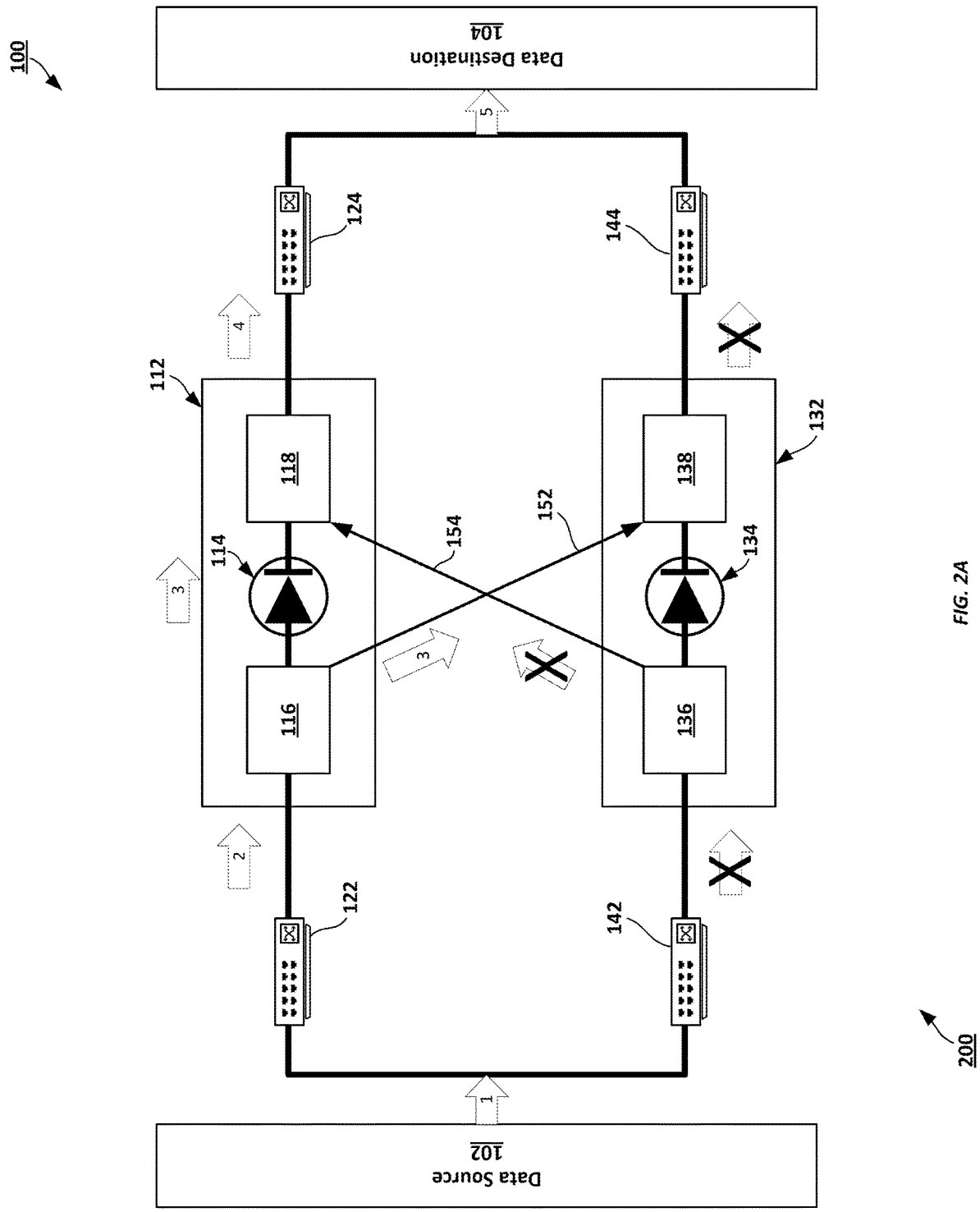
FIGS. 2A-C are schematic diagrams of data flow pathways in the example unidirectional, bilateral network system of FIGS. 1A-B in accordance with embodiments of the present disclosure.
Figure 2B:
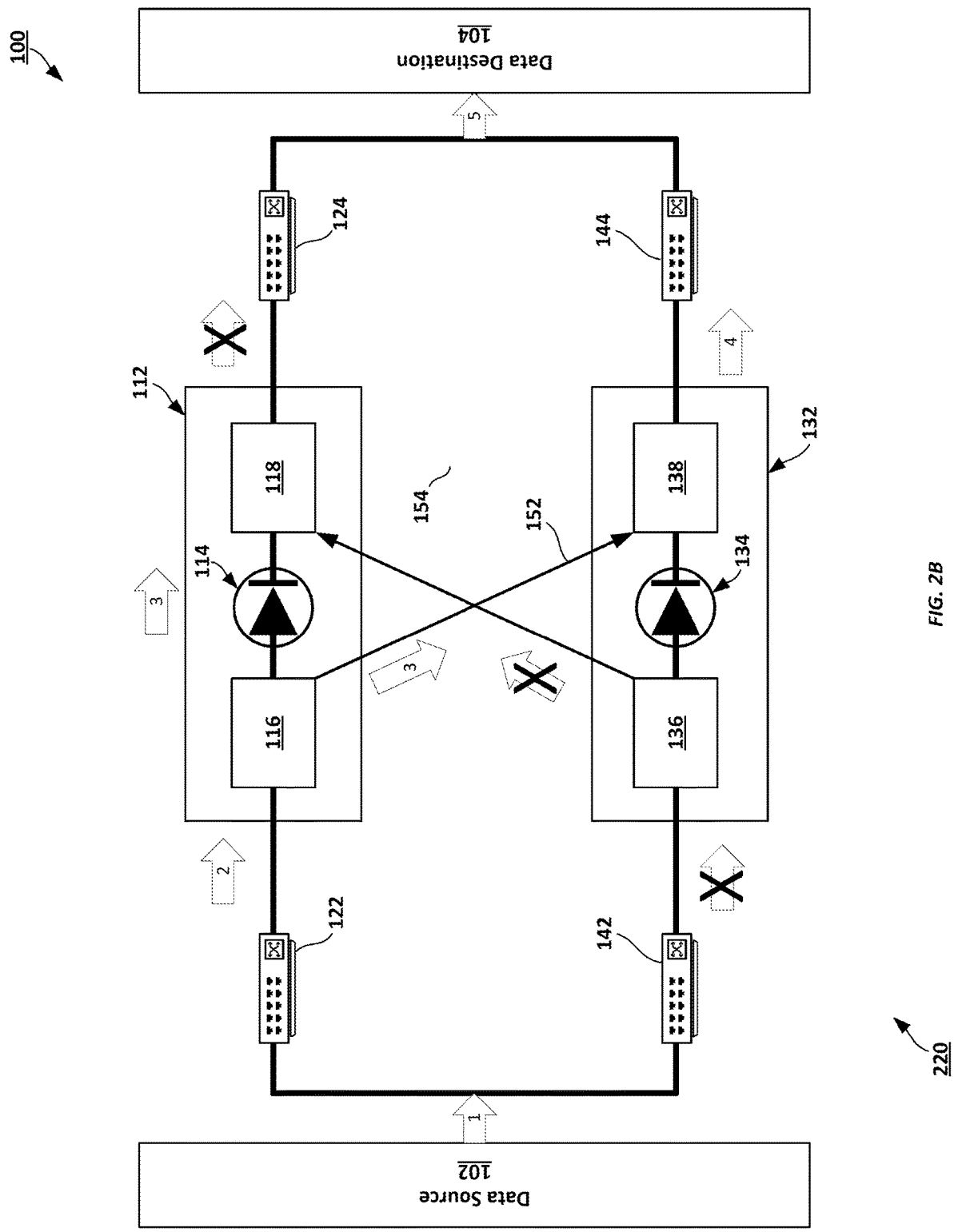
Figure 2C:
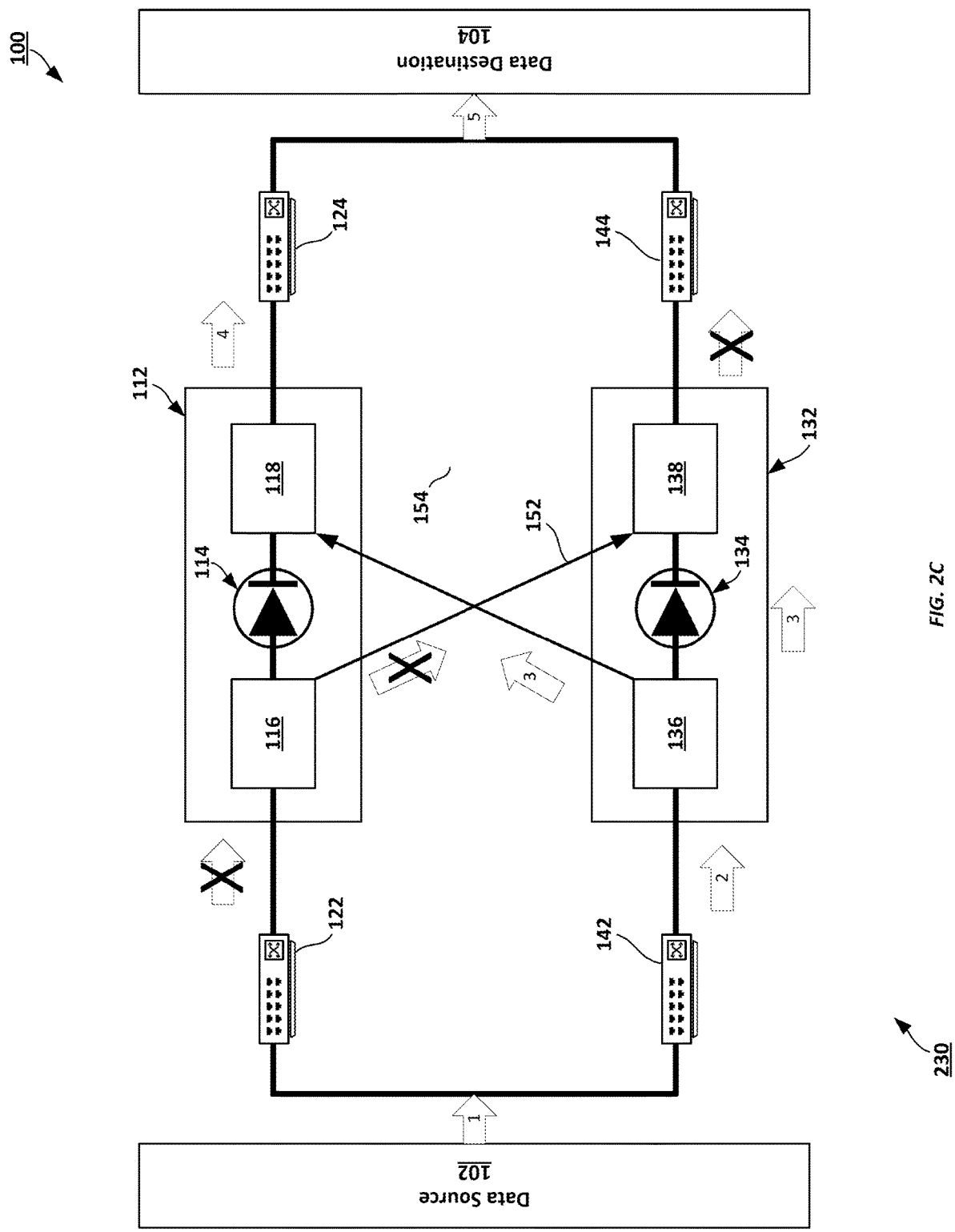

In FIGS. 1A-B, a primary unidirectional crosslink 152 couples the primary low-side network element 116 with the secondary high-side network element 138. The primary unidirectional crosslink 152 can include one or more network elements that allow data transmission in one direction (i.e., permissible from the primary low-side network element 116 to secondary high-side network element 138) and do not permit transmission in the reverse direction (i.e., impermissible from the secondary high-side network element 138 to primary low-side network element 116). For example, a data diode can be used as part of the primary unidirectional crosslink 152 to ensure one-way data propagation. Likewise, a secondary unidirectional crosslink 154 couples the secondary low-side network element 136 with the primary high-side network element 118. The secondary unidirectional crosslink 154 can include one or more network elements that allow data transmission in one direction (i.e., permissible from the secondary low-side network element 136 to primary high-side network element 118) and do not permit transmission in the reverse direction (i.e., impermissible from the primary high-side network element 118 to secondary low-side network element 136). The crosslinks introduce a one-way communication channel from primary low-side 162 to the secondary high-side 168; and from the secondary low-side 166 to the secondary high-side 168. FIGS. 2A-C illustrate how data can flow for various system operational states.

FIGS. 2A-C are schematic diagrams of data flow pathways in the example unidirectional, bilateral network system 100 of FIGS. 1A-B in accordance with embodiments of the present disclosure. FIG. 2A illustrates a scenario 200 where each of the primary data channel 110 elements are functioning and at least the secondary high-side components are functioning. At (1), a data packet is transmitted from an output port of the data source 102. Because heartbeat information for the primary low-side 162 (shown in FIG. 1B) indicates that primary low-side elements are operational, including primary low-side network element 116 and in some cases, primary low-side network switch 122, the data at (2) is sent to the floating IP (also known as virtual IP) on the primary data channel 110 via the primary low-side network switch 122. In the embodiment of the unidirectional, bilateral network system 100, at (3) the data packet is sent to the primary high-side network element 118 through the primary data diode 114; and a copy of the data packet is sent to the secondary high-side network element 138 via the primary unidirectional crosslink 152.

In this example shown in FIG. 2A, the primary high-side network element 118 is operational, and so at (4), the primary high-side network element 118 can send the data packet to the primary high-side network switch 124, which in turn, at (5) transmits the data packet to the data destination 104.

The secondary high-side network element 138, having previously received heartbeat information from the primary high-side network element (e.g., with some window of time), can recognize that the primary high-side components are operational, and therefore, will ignore the data packet. The secondary high-side network element 138 can delete the duplicate copy of the data packet without transmitting the data packet. The secondary high-side network element can ignore and delete the data packet because it knows that the primary high-side components are operational and will transmit the data packet.

As shown by the "X" notations in FIG. 2A, the data packet in this example does not traverse the secondary low-side 166 (shown in FIG. 1B) or the secondary unidirectional crosslink 154. This is because at least the primary low-side components are known to be operational, as recognized through the heartbeat information indication primary low-side component status maintained by the primary low-side network element 116.

FIG. 2B illustrates a scenario 220 where the primary high-side network element 118 is non-functioning or experiencing fault condition. At (1), the data packet is sent from the data source 102 to the primary data channel 110 via the primary low-side network switch 122 because at least the primary low-side components are operational, as recognized by the heartbeat information status maintained by the primary low-side network element 116. At (2), the data then is sent to the floating IP (also known as virtual IP) at primary low-side network element 116 of the primary data diode structure 112. At (3), the data packet is sent to the primary high-side network element 118 through the primary data diode 114; and a copy of the data packet is sent to the secondary high-side network element 138 via the primary unidirectional crosslink 152. In this case, the primary high-side network element 118 is non-functioning or experiencing a fault condition such that it cannot send the data packet. The secondary high-side network element 138, however, can send the data packet because it is functioning. The secondary high-side network element 138 can recognize that the primary high-side network element 118 (or other primary high-side component) is not functioning properly based on the heartbeat information received from the primary high-side network element 118 and maintained by the secondary high-side network element 138. At (4), the secondary high-side network element, having recognized that the primary high-side network element is non-functional, sends the data packet towards the secondary high-side network switch 144. At (5), the data packet is transmitted to the data destination 104.

FIG. 2C illustrates a scenario 230 where the primary low-side 162 is experiencing a fault at one or more components. At (1), the data packet is output from the data source. The data packet is transmitted to the secondary data channel 130 via the secondary low-side network switch 142. At (2), the data packet then is sent to the floating IP (also known as virtual IP) to the secondary low-side network element 136 of the secondary data diode structure 132. At (3), the data packet is sent to the secondary high-side network element 138 through the secondary data diode 134; and a copy of the data packet is sent to the primary high-side network element 118 via the secondary unidirectional crosslink 154.

In this case, the primary high-side network element 118 recognizes that primary high-side components are operational based on the heartbeat information maintained at the primary high-side network element 118. Therefore, at (4) the primary high-side network element 118 transmits the data packet to the primary high-side network switch 124. The secondary high-side network element 138 recognizes that the primary high-side components are functioning based on the heartbeat information stored therein, and can ignore and delete the data packet.

At (5), the data packet is delivered to the data destination 104.

Figure 3:
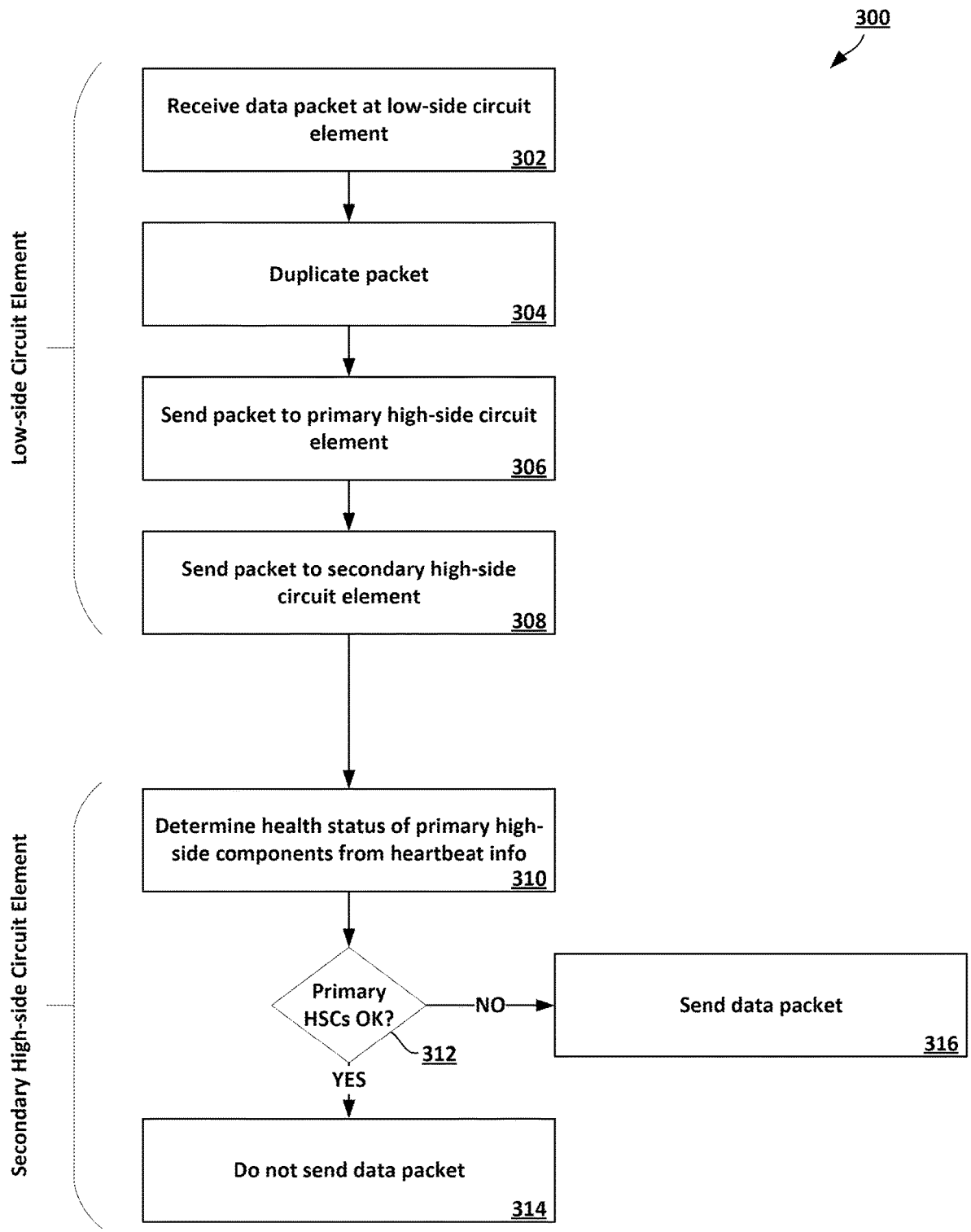
FIG. 3 is a process flow diagram for operating the example unidirectional, bilateral network system of FIGS. 1A-B in accordance with embodiments of the present disclosure.

FIG. 3 is a diagram of process flow 300 for operating the example unidirectional, bilateral network system of FIGS. 1A-B in accordance with embodiments of the present disclosure. For clarity of presentation, the description that follows generally describes process flow 300 in the context of the other figures in this description. However, it will be understood that process flow 300 can be performed, for example, by any suitable system, environment, software, and hardware, or a combination of systems, environments, software, and hardware, as appropriate. In some implementations, various steps of method of FIG. 3 can be run in parallel, in combination, in loops, or in any order.

At (302), a data packet can be received at a low-side network element. The low-side network element can be either a primary low-side network element or a secondary low-side network element, depending on which low-side of the data channel is operating normally.

At (304), the low-side network element can duplicate the data packet.

At (306), the low-side network element can transmit data packet to the primary high-side network element. If the low-side network element is a primary low-side network element, then it transmits the data packet to the primary high-side network element through the primary data diode. If the low-side network element is a secondary low-side network element, then it transmits a copy of the data packet to the primary high-side network element through the secondary unidirectional crosslink.

At (308), the low-side network element can transmit the data packet to the secondary high-side network element. If the low-side network element is a primary low-side network element, then it transmits a copy of the data packet to the secondary high-side network element through the primary unidirectional crosslink. If the low-side network element is a secondary low-side network element, then it transmits the data packet to the secondary high-side network element through the secondary data diode.

At (310), the secondary high-side network element can determine the health status of the primary high-side components, such as the primary high-side network element. If the primary high-side network element and other primary high-side components are functioning properly (312), then at (314), the secondary high-side network element does not send the data packet (and can delete the data packet). This is due to the assumption that because the primary high-side components are indicated as functioning, then the primary high-side components will transmit the data packet; and the secondary high-side network element does not need to take any action.

If, however, the primary high-side network element and other primary high-side components are indicated as not functioning properly (e.g., from heartbeat information) (312), then at (316), the secondary high-side network element sends the data packet to a next destination identified from the data packet address information or other header information. This is because it is assumed that since the information about the health status of the primary high-side components indicates fault or other error, the high-side components cannot send the data packet.

Figure 4:
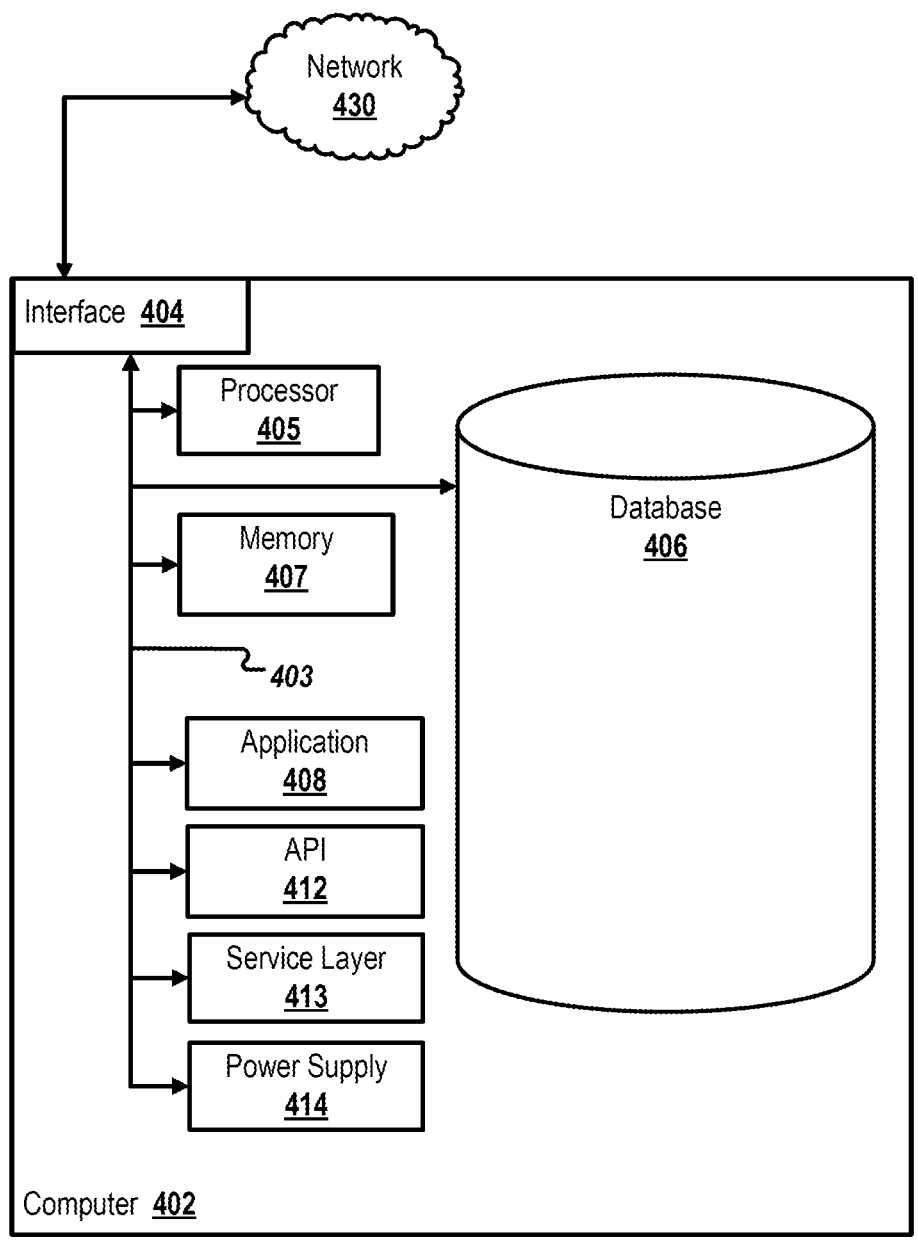
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination, as described below in the following examples:

Example 1 is a unidirectional, bilateral network system that includes a primary data channel including a primary one-way data diode connecting a data source to a data destination, wherein the primary one-way data diode includes a primary low-side network element and a primary high-side network element, the primary one-way data diode configured to permit data flow from the primary low-side network element to the primary high-side network element and not from the primary high-side network element to the primary low-side network element; a secondary data channel including a secondary one-way data diode connecting the data source to the data destination, wherein the secondary one-way data diode includes a secondary low-side network element and a secondary high-side network element, the secondary one-way data diode configured to permit data flow from the secondary low-side network element to the secondary high-side network element and not from the secondary high-side network element to the secondary low-side network element; a heartbeat link coupling the primary high-side network element and the secondary high-side network element, the heartbeat link to transmit a periodic signal from the primary high-side network element to the secondary high-side network element at regular intervals to indicate a status of the primary high-side network element; and a unidirectional cross-communications link coupling the primary low-side network element to the secondary high-side network element, the unidirectional cross-communications link configured to transmit data from the primary low-side network element to the secondary high-side network element and not from the secondary high-side network element to the primary low-side network element; wherein the primary low-side network element is configured to transmit a copy of data to the secondary high-side network element across the unidirectional cross-communications link; and wherein the secondary high-side network element is configured to transmit or ignore data received on the unidirectional cross-communication link based on the status of the primary high side network element.

Example 2 may include the subject matter of example 1, wherein the secondary high-side network element is configured to transmit the data received on the unidirectional cross-communications link towards the data destination when the status of the primary high-side network element indicates that the primary high-side network element is experiencing a fault condition; and ignore the data received on the unidirectional cross-communications link when the status of the primary high-side network element indicates that the primary high-side network element is functioning.

Example 3 may include the subject matter of any of examples 1-2, wherein the primary low-side network element is configured to receive a data packet originating from the data source; transmit the data packet through the primary one-way diode to the primary high-side network element; and transmit a duplicate of the data packet through the unidirectional cross-communications link to the secondary high-side network element.

Example 4 may include the subject matter of any of examples 1-3, wherein the unidirectional cross-communications link is a primary unidirectional cross-communications link, and the unidirectional, bilateral network system further includes a secondary unidirectional cross-communications link coupling the secondary low-side network element to the primary high-side network element, the secondary unidirectional cross-communications link configured to transmit data from the secondary low-side network element to the primary high-side network element and not from the primary high-side network element to the secondary low-side network element.

Example 5 may include the subject matter of example 4, wherein the primary high-side network element is configured to transmit a data packet originating from the data source towards the data destination, wherein the data packet is received from either the primary one-way data diode or the secondary unidirectional cross-communications link.

Example 6 may include the subject matter of example 4, wherein the heartbeat link is a high-side heartbeat link, the system further including a low-side heartbeat link coupling the primary low-side network element and the secondary low-side network element, the heartbeat link to transmit a periodic signal from the primary low-side network element to the secondary low-side at regular intervals to indicate a status of the primary low-side network element.

Example 7 may include the subject matter of example 6, wherein the secondary low-side network element is configured to receive a data packet originating from the data source; determine a health status of the primary low-side network element indicates that the primary low-side network element is experiencing a fault condition; transmit the data packet through the secondary one-way diode to the secondary high-side network element; and transmit a duplicate of the data packet through the unidirectional cross-communications link to the primary high-side network element.

Example 8 may include the subject matter of example 7, wherein the secondary high-side network element is to receive the data packet; determine the health status of the primary high-side network element; and transmit the data packet towards the data destination based on the health status of the primary high-side network element indicating a fault condition.

Example 9 is a method that includes receiving a data packet at a low-side network element of a unidirectional, bilateral network system; transmitting the data packet to a primary high-side network element through a primary one-way data diode; and transmitting a duplicate of the data packet to a secondary high-side network element through a unidirectional cross-communications link.

Example 10 may include the subject matter of example 9, and can also include receiving, at the secondary high-side network element, a health status from the primary high-side network element; determining, by the secondary high-side network element, that the primary high-side network element is experiencing a fault condition based on the health status; and transmitting the data packet towards a data destination based on the determination that the primary high-side network element is experiencing the fault condition.

Example 11 may include the subject matter of any of examples 9-10, and can also include receiving, at the secondary high-side network element, a health status from the primary high-side network element; determining, by the secondary high-side network element, that the primary high-side network element is operational; and deleting the data packet based on the determination that the primary high-side network element is operational.

Example 12 may include the subject matter of any of examples 9-11, and can also include transmitting, by the primary high-side network element, the data packet towards a data destination.

Example 13 may include the subject matter of any of examples 9-12, wherein the low-side network element includes a primary low-side network element, and the method includes receiving, at a secondary low-side network element, a health status of the primary low-side network element.

Example 14 may include the subject matter of example 13, and can also include receiving the data packet at the secondary low-side network element; determining, by the secondary low-side network element, that the primary low-side network element is experiencing a fault condition based on the health status; and transmitting the data packet to the secondary high-side network element through a secondary one-way data diode; and transmitting a duplicate of the data packet to the primary high-side network element through a secondary unidirectional cross-communications link.

Example 15 is a non-transitory, computer-readable storage medium storing instructions that, when executed by a hardware processor, perform operations that include receiving a data packet at a low-side network element of a unidirectional, bilateral network system; transmitting the data packet to a primary high-side network element through a primary one-way data diode; and transmitting a duplicate of the data packet to a secondary high-side network element through a unidirectional cross-communications link.

Example 16 may include the subject matter of example 15, the operations can also include receiving, at the secondary high-side network element, a health status from the primary high-side network element; determining, by the secondary high-side network element, that the primary high-side network element is experiencing a fault condition based on the health status; and transmitting the data packet towards a data destination based on the determination that the primary high-side network element is experiencing the fault condition.

Example 17 may include the subject matter of any of examples 15-16, the operations can also include receiving, at the secondary high-side network element, a health status from the primary high-side network element; determining, by the secondary high-side network element, that the primary high-side network element is operational; and deleting the data packet based on the determination that the primary high-side network element is operational.

Example 18 may include the subject matter of any of examples 15-17, the operations can also include transmitting, by the primary high-side network element, the data packet towards a data destination.

Example 19 may include the subject matter of any of examples 15-18, wherein the low-side network element includes a primary low-side network element, and the operations include receiving, at a secondary low-side network element, a health status of the primary low-side network element.

Example 20 may include the subject matter of example 19, the operations can also include receiving the data packet at the secondary low-side network element; determining, by the secondary low-side network element, that the primary low-side network element is experiencing a fault condition based on the health status; and transmitting the data packet to the secondary high-side network element through a secondary one-way data diode; and transmitting a duplicate of the data packet to the primary high-side network element through a secondary unidirectional cross-communications link.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium

What is claimed is:

1. A unidirectional, bilateral network system comprising:
a primary data channel comprising a primary one-way data diode connecting a data source to a data destination, wherein the primary one-way data diode comprises a primary low-side network element and a primary high-side network element, the primary one-way data diode configured to permit data flow from the primary low-side network element to the primary high-side network element and not from the primary high-side network element to the primary low-side network element;
a secondary data channel comprising a secondary one-way data diode connecting the data source to the data destination, wherein the secondary one-way data diode comprises a secondary low-side network element and a secondary high-side network element, the secondary one-way data diode configured to permit data flow from the secondary low-side network element to the secondary high-side network element and not from the secondary high-side network element to the secondary low-side network element;
a heartbeat link coupling the primary high-side network element and the secondary high-side network element, the heartbeat link to transmit a periodic signal from the primary high-side network element to the secondary high-side network element at regular intervals to indicate a status of the primary high-side network element; and
a unidirectional cross-communications link coupling the primary low-side network element to the secondary high-side network element, the unidirectional cross-communications link configured to transmit data from the primary low-side network element to the secondary high-side network element and not from the secondary high-side network element to the primary low-side network element;
wherein the primary low-side network element is configured to transmit a copy of data to the secondary high-side network element across the unidirectional cross-communications link; and
wherein the secondary high-side network element is configured to transmit or ignore data received on the unidirectional cross-communication link based on the status of the primary high side network element.

2. The unidirectional, bilateral network system of claim 1, wherein the secondary high-side network element is configured to:
transmit the data received on the unidirectional cross-communications link towards the data destination when the status of the primary high-side network element indicates that the primary high-side network element is experiencing a fault condition; and
ignore the data received on the unidirectional cross-communications link when the status of the primary high-side network element indicates that the primary high-side network element is functioning.

3. The unidirectional, bilateral network system of claim 1, wherein the primary low-side network element is configured to:
receive a data packet originating from the data source;
transmit the data packet through the primary one-way diode to the primary high-side network element; and
transmit a duplicate of the data packet through the unidirectional cross-communications link to the secondary high-side network element.

4. The unidirectional, bilateral network system of claim 1, wherein the unidirectional cross-communications link is a primary unidirectional cross-communications link, and
the unidirectional, bilateral network system further comprises a secondary unidirectional cross-communications link coupling the secondary low-side network element to the primary high-side network element, the secondary unidirectional cross-communications link configured to transmit data from the secondary low-side network element to the primary high-side network element and not from the primary high-side network element to the secondary low-side network element.

5. The unidirectional, bilateral network system of claim 4, wherein the primary high-side network element is configured to transmit a data packet originating from the data source towards the data destination, wherein the data packet is received from either the primary one-way data diode or the secondary unidirectional cross-communications link.

6. The unidirectional, bilateral network of claim 4, wherein the heartbeat link is a high-side heartbeat link, the system further comprising:
a low-side heartbeat link coupling the primary low-side network element and the secondary low-side network element, the heartbeat link to transmit a periodic signal from the primary low-side network element to the secondary low-side at regular intervals to indicate a status of the primary low-side network element.

7. The unidirectional, bilateral network system of claim 6, wherein the secondary low-side network element is configured to:
receive a data packet originating from the data source;
determine a health status of the primary low-side network element indicates that the primary low-side network element is experiencing a fault condition;
transmit the data packet through the secondary one-way diode to the secondary high-side network element; and
transmit a duplicate of the data packet through the unidirectional cross-communications link to the primary high-side network element.

8. The unidirectional, bilateral network system of claim 7, wherein the secondary high-side network element is to:
receive the data packet;
determine the health status of the primary high-side network element; and
transmit the data packet towards the data destination based on the health status of the primary high-side network element indicating a fault condition.

9. A method comprising:
receiving a data packet at a low-side network element of a unidirectional, bilateral network system;

transmitting the data packet to a primary high-side network element through a primary one-way data diode; and transmitting a duplicate of the data packet to a secondary high-side network element through a unidirectional cross-communications link;

wherein the low-side network element comprises a primary low-side network element, and the method comprises receiving, at a secondary low-side network element, a health status of the primary low-side network element;

the method, further comprising:

receiving the data packet at the secondary low-side network element;

determining, by the secondary low-side network element, that the primary low-side network element is experiencing a fault condition based on the health status;

transmitting the data packet to the secondary high-side network element through a secondary one-way data diode; and transmitting a duplicate of the data packet to the primary high-side network element through a secondary unidirectional cross-communications link.

10. The method of claim 9, further comprising:

receiving, at the secondary high-side network element, a health status from the primary high-side network element;

determining, by the secondary high-side network element, that the primary high-side network element is experiencing a fault condition based on the health status; and transmitting the data packet towards a data destination based on the determination that the primary high-side network element is experiencing the fault condition.

11. The method of claim 9, further comprising:

receiving, at the secondary high-side network element, a health status from the primary high-side network element;

determining, by the secondary high-side network element, that the primary high-side network element is operational; and deleting the data packet based on the determination that the primary high-side network element is operational.

12. The method of claim 9, further comprising transmitting, by the primary high-side network element, the data packet towards a data destination.

13. A non-transitory, computer-readable storage medium storing instructions that, when executed by a hardware processor, perform operations comprising:

receiving a data packet at a low-side network element of a unidirectional, bilateral network system;

transmitting the data packet to a primary high-side network element through a primary one-way data diode; and transmitting a duplicate of the data packet to a secondary high-side network element through a unidirectional cross-communications link;

wherein the low-side network element comprises a primary low-side network element, and the operations comprise receiving, at a secondary low-side network element, a health status of the primary low-side network element;

the operations further comprising:

receiving the data packet at the secondary low-side network element;

determining, by the secondary low-side network element, that the primary low-side network element is experiencing a fault condition based on the health status;

transmitting the data packet to the secondary high-side network element through a secondary one-way data diode; and transmitting a duplicate of the data packet to the primary high-side network element through a secondary unidirectional cross-communications link.

14. The non-transitory, computer-readable storage medium of claim 13, the operations further comprising:

receiving, at the secondary high-side network element, a health status from the primary high-side network element;

determining, by the secondary high-side network element, that the primary high-side network element is experiencing a fault condition based on the health status; and transmitting the data packet towards a data destination based on the determination that the primary high-side network element is experiencing the fault condition.

15. The non-transitory, computer-readable storage medium of claim 13, the operations further comprising:

receiving, at the secondary high-side network element, a health status from the primary high-side network element;

determining, by the secondary high-side network element, that the primary high-side network element is operational; and deleting the data packet based on the determination that the primary high-side network element is operational.

16. The non-transitory, computer-readable storage medium of claim 13, the operations further comprising transmitting, by the primary high-side network element, the data packet towards a data destination.

* * * * *

UNITED STATES PATENT AND TRADEMARK OFFICE
CERTIFICATE OF CORRECTION

PATENT NO. : 12,047,460 B2
APPLICATION NO. : 18/073115
DATED : July 23, 2024
INVENTOR(S) : Mohammed I. Alghannam and Nasser S. Alharthi Page 1 of 1

It is certified that error appears in the above-identified patent and that said Letters Patent is hereby corrected as shown below:

In the Claims

In Column 21, Line 62, Claim 1, please replace "high side" with -- high-side --

In Column 22, Line 36, Claim 6, please replace "network" with -- network system --

Signed and Sealed this
First Day of October, 2024

Katherine Kelly Vidal
*Director of the United States Patent and Trademark Office*